Figure 1:
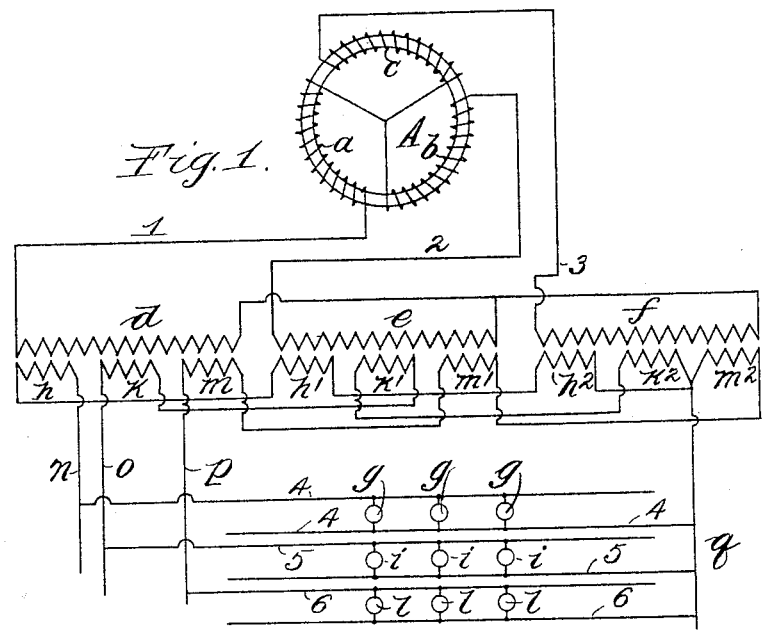

(No Model.) 2 Sheets—Sheet 1.

P. M. HELDT.
SYSTEM OF ELECTRICAL DISTRIBUTION.

No. 583,622. Patented June 1, 1897.

Witnesses:
J. W. C. Sanner
George L. Cragg

Inventor
Peter M. Heldt,
By Burton & Brown
Attorneys.

(No Model.) 2 Sheets—Sheet 2.

P. M. HELDT.
SYSTEM OF ELECTRICAL DISTRIBUTION.

No. 583,622. Patented June 1, 1897.

Witnesses:
D. W. C. Danner.
George L. Cragg

Inventor,
Peter M. Heldt,
By Bostous Brown
Attorneys.

UNITED STATES PATENT OFFICE.

PETER M. HELDT, OF CHICAGO, ILLINOIS.

SYSTEM OF ELECTRICAL DISTRIBUTION.

SPECIFICATION forming part of Letters Patent No. 583,622, dated June 1, 1897.

Application filed November 16, 1896. Serial No. 612,389. (No model.)

*To all whom it may concern:*

Be it known that I, PETER M. HELDT, a subject of the Emperor of Germany, residing at Chicago, in the county of Cook and State of Illinois, have invented a certain new and useful Improvement in Systems of Electrical Distribution, (Case No. 1,) of which the following is a full, clear, concise, and exact description, reference being had to the accompanying drawings, forming a part of this specification.

My invention relates to multiphase electric currents, and has for its object provision of means whereby the potential in the conducting-mains leading from generators of multiphase currents to points of application is maintained equal.

In systems of transmitting and distributing multiphase electric currents a serious objection has been found in the unbalancing of potential in the conducting-mains by reason of the non-uniform condition of use of the secondary circuits. For example, in the distribution of three-phase currents each primary coil of an induction-coil is associated with a secondary coil adapted to supply current to the translating devices associated therewith.

If the translating devices in one secondary circuit are all in use and those in the other secondary circuits are not in use, the particular primary coil associated with the active secondary coil is loaded, while the remaining primary coils are mere dead resistances in the path of the current leading to the active primary coil.

In accordance with my invention each primary coil imparts a portion of the energy supplied to the active secondary circuit or circuits, the portions of the energy thus supplied being preferably equal, whereby the loads upon the conducting-mains are equalized.

One manner of practicing my invention as applied to distribution of three-phase currents, for example, consists in dividing each secondary coil into three parts, each part being associated with a different primary coil, so that if, for instance, but one secondary circuit is active each primary coil will contribute to the energy required by said secondary circuit.

There are many other ways in which my invention may be practiced, some of which will be referred to hereinafter.

I am aware that there are motors which are adapted to be associated with the main conductors of polyphase currents in a manner to cause an equal distribution of the load supplied to the motor among the main conductors. There are motors of other types, however, in which the equal distribution of the load among the main conductors cannot at all times be maintained.

My invention will be more readily understood by reference to the accompanying drawings, in which—

Figure 2:
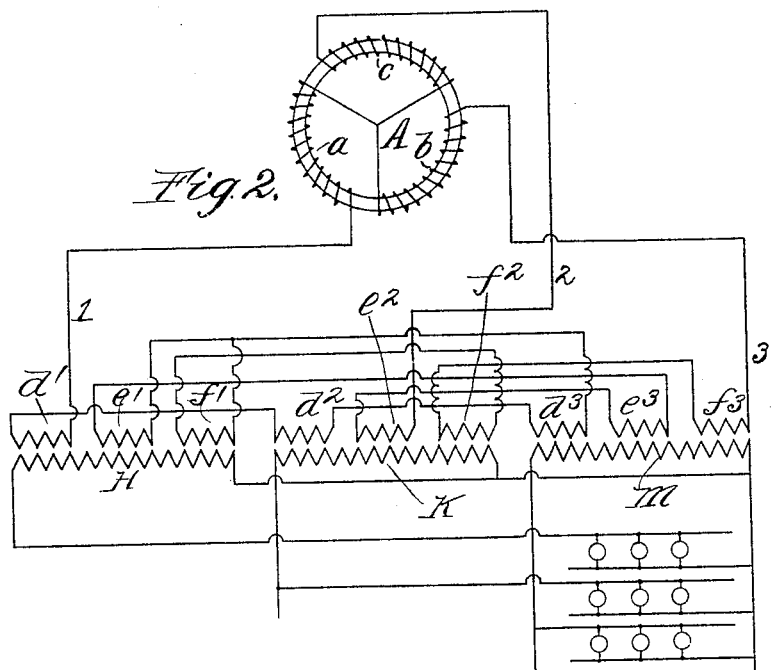
Figure 3:
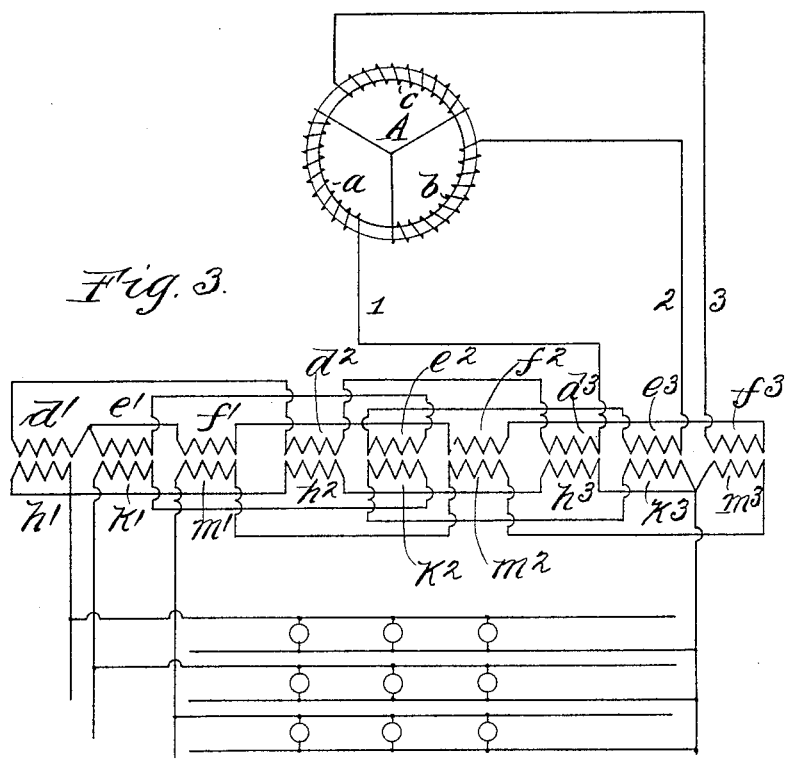
Figure 4:
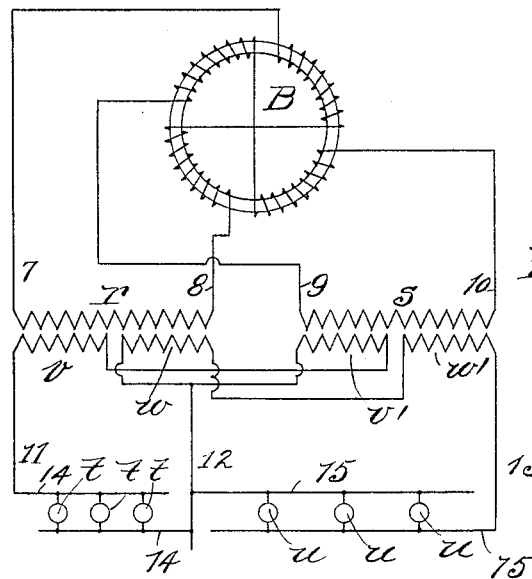

Figure 1 shows a triphase load-balancing-transformer distributing system embodying my invention. Figs. 2 and 3 show modifications of the system illustrated in Fig. 1. Fig. 4 illustrates a system for distributing two-phase currents in accordance with my invention.

Like letters and figures refer to like parts throughout the different views.

Referring to Fig. 1, the generator A is provided with three generating-coils $a\ b\ c$, which are connected in star fashion. These coils are connected by mains 1, 2, and 3 with coils $d\ e\ f$, which constitute the primary coils of transformers. These coils are also connected star fashion, the three primary windings being disposed upon separate iron cores, one winding to each core, or they may be placed on a core having a multiple magnetic circuit in the well-known manner.

Secondary coils are associated with the primary coils, each secondary coil being in this instance divided into three equal parts, each primary coil being disposed in inductive relation to one of said divisions of the secondary coil.

The translating devices $g\ g\ g$, which are, for example, electric lamps, are placed in circuit with a secondary coil composed of three helices $h\ h'\ h^2$ of equal capacity, said helices $h\ h'\ h^2$ being placed in inductive relation to the primary coils $d$, $e$, and $f$, respectively. Translating devices $i\ i\ i$ are placed in circuit with a secondary coil composed of three helices $k\ k'\ k^2$ of equal capacity, said helices $k\ k'\ k^2$ being placed in inductive relation to the primary coils $d$, $e$, and $f$, respectively.

Translating devices $l\,l\,l$ are placed in circuit with a secondary coil composed of three helices $m\,m'\,m^2$ of equal capacity, said helices $m\,m'\,m^2$ being placed in inductive relation to the primary coils $d$, $e$, and $f$, respectively.

The helices $h$, $k$, and $m$ of the secondary coils are connected with the secondary mains $n\,o\,p$, while the helices $h^2$, $k^2$, and $m^2$ terminate in a neutral conductor $q$.

The conductors, including the translating devices $g$, $i$, and $l$, are designated by the numerals 4, 5, and 6, respectively, these conductors being each connected to the neutral wire $q$ at one end and to the secondary mains $n\,o\,p$, respectively, at the other end. If, for instance, the translating devices included in one consumption-circuit are alone being operated, it will be apparent that each of the primary coils will supply equal portions of the energy consumed by said translating devices, or if any number of translating devices in any or all of the consumption-circuits are being operated the primary coils will contribute equal portions of the energy used by said translating devices.

Since the resultant electromotive force in connected generating or inducing coils carrying current differing uniformly in phase is zero when the current passes therethrough in the same direction, I invert one of the divisions of each secondary coil, whereby the electromotive force of the inverted division or helix is added to the resultant electromotive force of the two remaining divisions or helices. Each primary coil is preferably associated with one inverted helix only.

Referring to Fig. 2, the secondary coils H, K, and M are each formed of one continuous winding. Each of the primary coils is divided in three equal parts, each secondary coil being disposed in inductive relation to a portion of each primary coil. As shown, the divisions $d'$, $e'$, and $f'$, which form parts of the primary coils connected with the mains 1, 2, and 3, are associated with secondary coil H. The divisions $d^2$, $e^2$, and $f^2$ and divisions $d^3$, $e^3$, and $f^3$ likewise form parts of the primary coils, the first group $d^2\,e^2\,f^2$ being associated with secondary coil K, while the second group $d^3\,e^3\,f^3$ is associated with secondary coil M. One division of each of the primary coils, as $d'$, $e^2$, and $f^3$, is inverted to add its electromotive force to the resultant electromotive force between the two remaining coils of uniform direction.

In Fig. 3 both the primary and secondary coils are illustrated as being divided each into three equal portions. The three primary coils comprise divisions $d'\,d^2\,d^3$, $e'\,e^2\,e^3$, and $f'\,f^2\,f^3$. The secondary coils comprise the divisions $h'\,h^2\,h^3$, $k'\,k^2\,k^3$, and $m'\,m^2\,m^3$. The divisions $d'$, $e^2$, and $f^3$ of the primary coils are inverted, as are the divisions $h'$, $k^2$, and $m^3$ of the secondary coil, for the purpose above set forth. The divisions $d'\,e'\,f'\,d^2\,e^2\,f^2\,d^3\,e^3\,f^3$ of the primary coils are placed in inductive relation to the divisions $h'\,k'\,m'\,h^2\,k^2\,m^2\,h^3\,k^3\,m^3$ of the secondary coils. It will thus be seen that each secondary coil has a division of each primary coil associated therewith and that each primary coil has a division of each secondary coil associated therewith.

Fig. 4 illustrates the generator B of two-phase currents, mains 7, 8, 9, and 10 extending from said generator to the point of distribution. The primary coils $r$ and $s$ may be wound upon two separate cores or upon one core having a double magnetic circuit in a manner well-known in the art. Two secondary coils are included in circuit with the secondary mains 11, 12, and 13. Translating devices $t\,t\,t$ are included in a conductor 14, connected between the secondary mains 11 and 12. Translating devices $u\,u\,u$ are included in a conductor 15, connected between secondary mains 12 and 13. Each secondary coil is formed of two helices of equal capacity. The helices $v$ and $v'$ of the secondary coil are disposed in inductive relation to the primary coils $r$ and $s$, respectively. The helices $w$ and $w'$ of the second secondary coil are likewise disposed in inductive relation to the primary coils $r$ and $s$, respectively. The helices $v$ and $v'$ of one secondary coil are inverted, while the helices $w$ and $w'$ are wound in a uniform direction. By this arrangement I am enabled to obtain two-phase currents differing in phase by ninety degrees.

By means of my invention I am enabled to prevent a difference in drop of potential in the armature-windings in the main conductors and the primaries of transformers due to an unequal distribution of the load on the secondaries.

In the system of my invention the coils of the generator produce currents of equal value at all times, whereas with generators of multiphase currents as heretofore employed in connection with distribution systems the current in the coils in circuit with the loaded branches are in proportion to the loads on those branches. In systems heretofore in use it was necessary to reduce the armature reactions by employing coils of few turns, or to counteract the armature reaction by employing an automatic or manual regulating device for cutting in additional field-conductors. By this means, however, the coil or coils supplying the particular branches in circuit with the loaded primary coil or coils of the induction-coil would be alone regulated, and in order to effect the required regulation in the remaining coil or coils of the generator artificial resistance would have to be included in the main conductor or conductors connected with the latter generating coil or coils, which is not practicable.

By means of my invention, however, since the coils of the generator each contribute equally to the energy required at the point of application, the number of turns of wire in the generating-coils need not be limited, nor a switching device for controlling the field employed, nor extraneous resistance included in any of the mains for the purpose of regulating the relative pressure in the mains. It has heretofore been in practice impossible to maintain an equal drop of potential in the main conductors in the systems in use. By means of my invention I am enabled to obtain a larger output with a given machine than was heretofore possible.

There are other modifications and adaptations of my invention that may be readily made by those skilled in the art without departing from the principles thereof, and I do not, therefore, desire to be limited to the precise systems shown and described; but

I claim and desire to secure by these Letters Patent, together with all such modifications as may be made by mere skill, the following:

1. In a system of electrical distribution, the combination of a source of polyphase current, with a plurality of primary coils in circuit therewith, and a plurality of secondary coils in secondary circuits, said secondary coils being disposed in substantially equal inductive relation to each of said primary coils, substantially as described.

2. In a system of electrical distribution, the combination of a source of polyphase current, with primary coils in circuit therewith, and secondary coils each in a secondary circuit, each of said secondary coils being disposed in substantially equal inductive relation to each of said primary coils, substantially as described.

3. In a system of electrical distribution, the combination of a source of polyphase current, with a set of primary coils in circuit therewith, and a set of secondary coils equal in number to the primary coils, each coil being in a secondary circuit, each of said secondary coils being disposed in substantially equal inductive relation to each of said primary coils, substantially as described.

4. In a system of electrical distribution, the combination of a source of triphase current, with three primary coils in circuit therewith, and secondary coils in secondary circuits each disposed in substantially equal inductive relation to said primary coils, substantially as described.

5. In a system of electrical distribution, the combination of a source of polyphase current, with a set of primary coils in circuit therewith, and a set of secondary coils, the coils of one set being substantially equally subdivided, the number of subdivisions in each coil being equal to the number of coils in the other set, each coil whereof is disposed in inductive relation to a subdivision of each of the coils of the subdivided set, substantially as described.

6. In a system of electrical distribution, the combination of a generator of polyphase current, with conducting-mains leading therefrom, a set of primary coils connected with said conducting-mains, a set of secondary coils and secondary mains in circuit with the secondary coils, the coils of one set being substantially equally subdivided, the number of subdivisions in each coil being equal to the number of coils in the other set, each coil whereof is disposed in inductive relation to a subdivision of each of the coils of the subdivided set, substantially as described.

7. In a system of electrical distribution, the combination of a source of polyphase current, with a set of primary coils in circuit therewith and a set of secondary coils, the coils of the secondary set being substantially equally subdivided, the number of subdivisions in each coil being equal to the number of coils in the set, each primary coil being disposed in inductive relation to a subdivision of each secondary coil, substantially as described.

8. In a system of electrical distribution, the combination of a generator of polyphase current, with conducting-mains leading therefrom, a set of primary coils connected with said conducting-mains, a set of secondary coils and secondary mains in circuit with the coils, the coils of the secondary set being substantially equally subdivided, the number of subdivisions in each coil being equal to the number of coils in the set, each primary coil being disposed in inductive relation to a subdivision of each secondary coil, substantially as described.

9. In a system of electrical distribution, the combination of a source of triphase current, with three primary coils in circuit therewith, and three secondary coils, each primary coil having a part of each secondary coil disposed in inductive relation thereto, and each secondary coil having a part of each primary coil disposed in inductive relation thereto, substantially as described.

10. In a system of electrical distribution, the combination of a source of triphase current, with three primary coils in circuit therewith and three secondary coils, each primary coil having a portion of each secondary coil disposed in inductive relation thereto, substantially as described.

11. In a system of electrical distribution, the combination of a source of triphase current, with conducting-mains leading therefrom, a set of three primary coils connected with said conducting-mains, and a set of three secondary coils in secondary circuits, each of the secondary coils being disposed in substantially equal inductive relation to each of said primary coils, substantially as described.

12. In a system of electrical distribution, the combination of a source of triphase current, with conducting-mains leading therefrom, a set of three primary coils connected with said mains, a set of three secondary coils and secondary mains in circuit with said secondary coils, each of the primary and secondary coils being subdivided into substantially three equal divisions, each primary coil being disposed in inductive relation to one subdivision of each secondary coil, and each secondary coil being disposed in inductive relation to one subdivision of each primary coil, substantially as described.

13. In a system of electrical distribution, the combination of a source of triphase current, with conducting-mains leading therefrom, a set of three primary coils connected with said mains, a set of three secondary coils, and secondary mains connected with said secondary coils, each of the primary and secondary coils being subdivided into substantially three equal divisions, each primary coil having a division of each secondary coil disposed in inductive relation thereto, while each secondary coil has a division of each primary coil disposed in inductive relation thereto, one division of each coil being inverted, substantially as described.

14. In a system of electrical distribution, the combination of a source of triphase current, with main conductors leading therefrom, a set of primary coils in circuit with said main conductors, a set of secondary coils and secondary mains connected with said secondary coils, the coils of one of said sets each being divided into substantially three equal divisions, each coil of the other set being disposed in inductive relation to one division of each coil of the subdivided set, one division of each divided coil being inverted, substantially as described.

15. In a system of electrical distribution, the combination of a source of triphase current with conducting-mains connected therewith, a set of primary coils in circuit with said conducting-mains, a set of secondary coils and secondary mains connected with said secondary coils, each of said secondary coils being subdivided into substantially three equal parts, each primary coil having a division of each secondary coil disposed in inductive relation thereto, one of the divisions of each secondary coil being inverted, substantially as described.

16. In a system of electrical distribution, the combination of a source of triphase current, with primary coils in circuit therewith and a plurality of secondary coils in secondary circuits disposed in substantially equal inductive relation to each of said primary coils, substantially as described.

In witness whereof I hereunto subscribe my name this 28th day of October, A. D. 1896.

PETER M. HELDT.

Witnesses:
GEORGE L. CRAGG,
A. LYNN LAWRENCE.